(12) United States Patent
Hodgson

(10) Patent No.: US 7,670,518 B2
(45) Date of Patent: Mar. 2, 2010

(54) COMPOSITE PRODUCTS

(75) Inventor: Thomas Clarence Hodgson, Auckland (NZ)

(73) Assignee: Hi-Tech Engineering Limited, Huntly (AU)

( * ) Notice: Subject to any disclaimer, the term of this patent is extended or adjusted under 35 U.S.C. 154(b) by 1098 days.

(21) Appl. No.: 10/432,810

(22) PCT Filed: Nov. 23, 2001

(86) PCT No.: PCT/NZ01/00262

§ 371 (c)(1),
(2), (4) Date: Oct. 31, 2003

(87) PCT Pub. No.: WO02/42041

PCT Pub. Date: May 30, 2002

(65) Prior Publication Data

US 2004/0076820 A1 Apr. 22, 2004

(30) Foreign Application Priority Data

Nov. 23, 2000 (NZ) ................................. 508367
Mar. 23, 2001 (NZ) ................................. 510751

(51) Int. Cl.
*B27N 3/00* (2006.01)
(52) U.S. Cl. .................. 264/109; 264/101; 264/122; 264/911; 264/920
(58) Field of Classification Search .................. None
See application file for complete search history.

(56) References Cited

U.S. PATENT DOCUMENTS 5,200,457 A   4/1993   Vasishth et al.
5,728,338 A * 3/1998   Kiser ..................... 264/129

FOREIGN PATENT DOCUMENTS

| AU | 2002224246 | 1/2006 |
| DE | 1228053 | 10/1966 |
| DE | 1646051 | 7/1971 |
| DE | 3841007 A1 | 6/1989 |
| EP | 0 354 516 | * 2/1990 |
| EP | 01 997 379.1 | 7/2007 |
| FR | 2679482 | 1/1993 |
| GB | 2002652 | 2/1979 |
| JP | 61-074205 | 4/1986 |
| JP | 61-192515 | 8/1986 |
| JP | 05-329811 | 12/1993 |
| JP | 06031704 A | 2/1994 |
| JP | 07-223209 | 8/1995 |
| JP | 10-180721 | 7/1998 |
| JP | 11-333812 | 12/1999 |
| JP | P2002-544202 | 6/2007 |
| RU | 2106961 C1 | 3/1998 |

* cited by examiner

*Primary Examiner*—Mary Lynn F Theisen
(74) *Attorney, Agent, or Firm*—Baker Botts L.L.P.

(57) ABSTRACT

A method for producing a composite product including a substrate material and a binder, wherein either the binder includes a plastics material in an emulsion form, or a plastics material is added to an emulsion including the substrate material. The invention is also directed to composite products including a particulate substrate and particles of a plastics material therein.

17 Claims, 4 Drawing Sheets

COMPOSITE PRODUCTS

TECHNICAL FIELD

Figure 1:
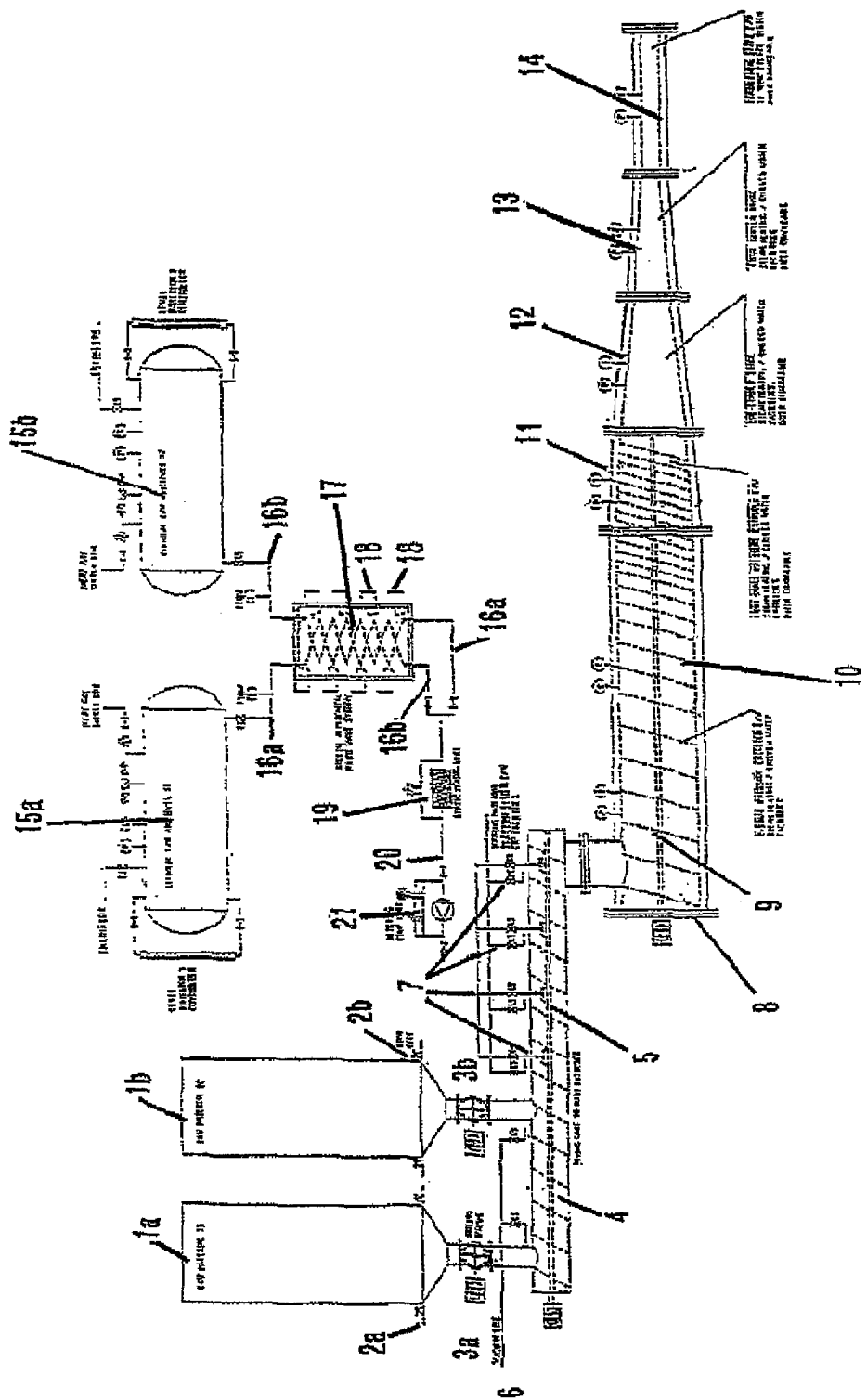

The invention relates to the manufacture of a composite product that includes a plastics material and to methods of producing such a product. The invention also relates to a method of preparing a plastics material for forming composite products.

BACKGROUND OF THE INVENTION

There are a variety of composite products currently available. These include, but should not be limited to, Fibreboard (MDF etc), Oriented Strand Board (OSB), Waferboard, amongst others. For the purposes of this specification such products, as they contain lignocellulosic material, will be referred to as lignocellulosic composite products for ease of reference.

There are many advantages in using lignocellulosic composite products in the place of raw timber. These include the ability to prepare a finished-looking timber product for immediate use, as well as the ability to use what would otherwise be waste material, in an effective and productive manner. In addition, the more use that can be made of waste timber products, the less natural timber will be needed. Typically, untreated soft wood timber composite products, and building materials formed from composite products made from reconstituted products material, have been found not to be sufficiently strong to fulfil the same functions as a hard wood timber. Furthermore, such products if untreated have a tendency to absorb moisture thereby causing the material to expand and suffer deterioration.

Usually, the manufacture of lignocellulosic composite products uses lignocellulosic particles (eg sawdust, bark, husks and the like) which are mixed with a binder composition. The binders can be broadly grouped into formaldehyde-based binders, polyurethane-type binders, phenolic-based and isocyanate-based binder products. In many cases, especially "phenolic line" production, toxic by-products are produced and the secure disposal of strips, off-cuts and contaminated water can be costly. Furthermore, considerable energy needs to be expended as the material has to be dried to approximately five percent (5%) moisture in order to cure the phenolic plastic. Such techniques have been used to improve the strength and water resistance of such materials.

It is also known to use plastics material in the manufacture of lignocellulosic composite board products. Usually, the amount of plastics materials in the starting material, (i.e. with the lignocellulosic particles) is around 50% by weight of the starting mixture. The plastic material is melted and the molten plastic and lignocellulosic material are blended and are then extruded through a die. Such a process does not require the presence of an additional binder (eg a phenolic-based binder or the like) but does require the use of a coupling agent to allow the lignocellulosic material to bind to the plastics material. The use of approximately 50% of plastics material in the manufacture of such composite board product, results in a product having a plastic appearance which is not always acceptable to consumers.

Lowering the amount of plastics material used in the manufacture of extruded composite board products, eg down to about 20% plastics material by weight, is also possible, provided the lignocellulosic particles used in the product are finer than about 40 mesh. Such processes still require the use of coupling agents but allow less plastic to be used and lessen the plastic look of the product. There is an inherent limitation in the process as a result of particle size restriction.

There would be distinct advantages in being able to make a composite board using a binder that includes a plastics material at even lower levels, if a product of adequate material characteristics can be produced using a broad range of particle sizes while minimising the plastic look being imparted to the final product. In addition, the less plastics material used, the lower the cost of production will be in general terms.

The ability to manufacture composite board products using substrates other than lignocellulosic material (eg rubber, non-recyclable plastics materials etc) would also be advantageous in terms of waste material use.

For the purposes of this specification the phrase "composite product" (without further qualification—eg lignocellulosic) should be taken to include reference to the use of lignocellulosic material, rubber or non-recyclable plastics material as the substrate from which the composite board product is made.

OBJECT OF THE INVENTION

With the above background in mind, it is an object of the invention to provide an alternative to existing products or at least to go some way to ameliorating problems with known options.

SUMMARY OF THE INVENTION

In a first aspect the invention provides a method for producing a composite product including a substrate material and a binder, wherein either the binder includes a plastics material in an emulsion form, or the plastics material is added to an emulsion including the substrate material.

Preferably the substrate material is particles of lignocellulosic material, rubber, or non-recyclable plastics material.

Preferably the substrate is a lignocellulosic material selected from any one or more of sawdust, wood chips, bark, rice husks, leaves, branches, paper, cardboard or the like.

In one preferred aspect the method includes the step of forming the plastics material for inclusion in the binder, or substrate emulsion, from basic component parts under vacuum seal.

In another aspect the method includes the step of melting a recyclable plastic material under vacuum seal.

Preferably the plastics material in the emulsion is a nylon, polyethylene, polypropylene, or polyester, or a mixture thereof.

Preferably the plastics material in the emulsion is nylon and in particular nylon-6.

Preferably the recyclable plastics material in the emulsion is sourced from raw waste plastic material.

Preferably the plastics material formed is nylon-6 and the basic component parts used in its formation selected from caprolactam, NL New™ (methol ethyl ketone peroxide), activator KU2-8107™ (a combination of triallylcyanurat and water soluble wax); polyethylene and acid (such as battery acid, sulphuric or hydrochloric acid).

Preferably the plastics material component parts are heated by passage through a conduit and directing microwaves toward the conduit to heat the component parts, or the conduit, and thereby the component parts.

Preferably, the process includes the steps of feeding the plastics material component parts into a conduit via an inlet which is connected to the conduit, providing at least one microwave transmitter which is adapted to direct microwaves toward the conduit to heat the component parts within the conduit, or to heat the conduit and thereby heat the component parts or both, and providing an outlet to the conduit to allow passage of the heated, formed, plastics material from the conduit.

Preferably the substrate is formed into an emulsion, the emulsion heated to a temperature above the melting point of the plastics material used, and the plastics material added to the emulsion in the form of a spray.

Preferably the heated plastics material is formed into an emulsion by combination with hot water in an emulsifier, and the emulsion thus formed is used as a binder to form a composite board product from particles of a substrate material.

Preferably the composite product is formed by extrusion or compression.

According to a further aspect of the present invention there is provided a method of reconstituting a lignocellulosic material, rubber and/or otherwise non-recyclable plastics material including the steps of forming the lignocellulosic material, rubber and/or plastics material into granulate or particulate substrate, forming said particulate substrate into an emulsion, selecting a suitable plastics material, heating the plastics material above its melting point, spraying the plastics material under pressure into the emulsified substrate so as to penetrate the surface of the substrate, then forming the resultant reconstituted product into a predetermined shape and cooling it below the melting point of the plastics material.

Preferably the substrate is ground to provide fibre lengths of between about 1.5 mm and about 3.0 mm, more preferably about 2.0 mm.

In another aspect the invention provides a method of putting a coating of a plastics material on the surface of a board wherein the plastics material is sprayed as a hot liquid onto the surface of the board.

Preferably the board is a timber board or composite board and the plastics material formed is sprayed onto the board to form a coating or to be used as a binder to form plywood following the compression from lengths of one or more boards.

Preferably the plastics material sprayed onto the board is nylon or a combination of polyethylene and caprolactam.

Preferably the plastic material is a combination of polyethylene and caprolactam and the combination is heated to between 170° C. and 190° C.

In a further aspect the invention provides a composite board product including particles of a lignocellulosic material and a binder, the binder containing a plastics material in emulsion form, wherein the composite board contains no more than about 10% by weight of the plastics material.

Preferably the composite board contains between about 1% and 5% of a plastics material.

Preferably, the composite board includes between 5% and 20% by weight binder, more preferably between 6% and 8% by weight.

Preferably, the lignocellulosic material is selected from sawdust, bark, wood chips, rice husks and the like.

Preferably the plastics material in the binder is a recyclable plastics material such as nylon and the like.

Preferably, the lignocellulosic material particles are between 2 mm and 60 mm in diameter.

Preferably, the binder is an emulsion mixture of
(a) formalin, or methylchloroisothiazolinone and/or methylisothiazolinone;
(b) polyethylene, polypropylene, nylon, PVC, styrofoam and/or acrylic;
(c) paraffin oil; and
(d) water.

Preferably, the binder is an emulsion mixture of formalin, polyethylene, paraffin oil and water.

Preferably, the binder is a mixture of methylchloroisothiazolinone and/or methylisothiazolinone with nylon, PVC, styrofoam, polypropylene and/or acrylic; paraffin oil and water.

Preferably the process for producing the plastics-based emulsion binder includes the steps of:
(a) mixing formalin, methylchloroisothiazolinone, or methylisothiazolinone with paraffin oil;
(b) melting a plastics material into the mixture formed in step (a);
(c) mixing the mixture of step (b) into boiling water for a suitable time to allow the temperature to drop to room temperature, to produce the binder.

In another aspect, the invention provides a composite product including a particulate substrate material selected from lignocellulosic material or rubber or non-recyclable plastics material, and a recyclable plastics material based binder, wherein the composite product includes particles of the recyclable plastics material distributed within the product.

DRAWINGS

FIG. 1: shows a schematic flow diagram of a "closed" method according to the invention in which the extrusion process according to one possible embodiment of the invention.

Figure 2:
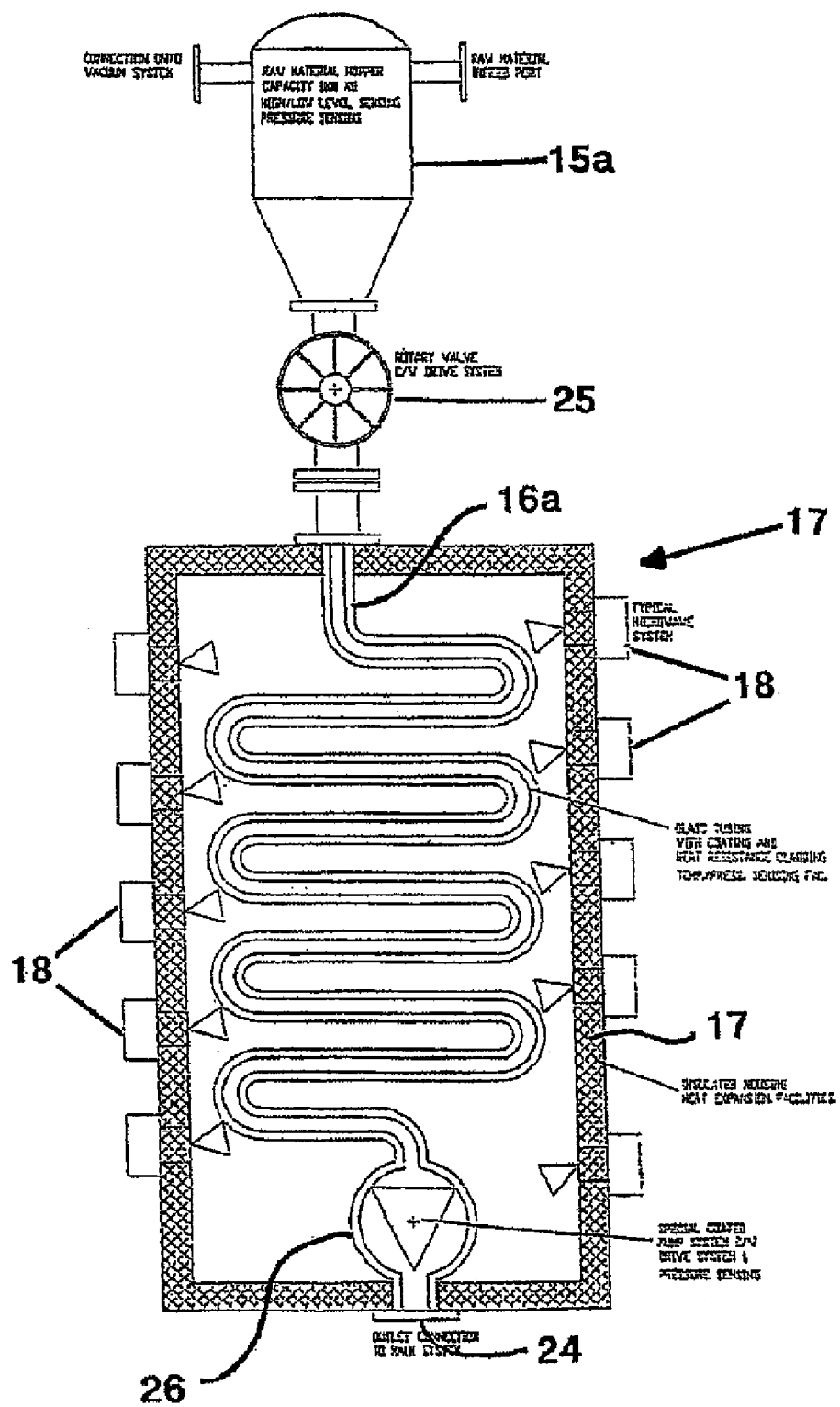

FIG. 2: shows a cross sectional view of an applicator used in the apparatus of FIG. 1.

Figure 3:
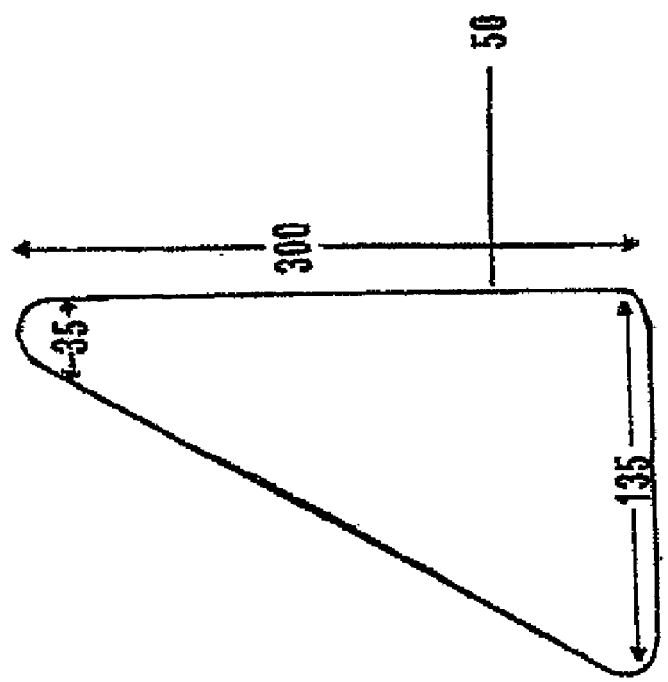

FIG. 3: shows shows an elevational view of a plate forming part of the apparatus of FIG. 1.

Figure 4:
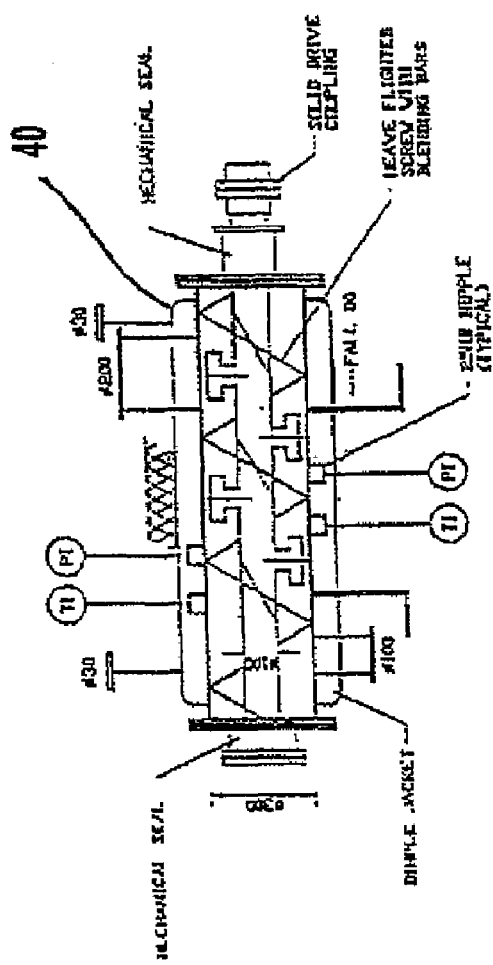

FIG. 4: shows a cross sectional view of a large paddle wiping mixer which may be employed in an alternative embodiment of the invention.

DETAILED DESCRIPTION OF THE INVENTION

The invention to which the present application is directed can generally be described as a composite board product which combines particles of a substrate material (lignocellulosic, rubber, non-recyclable plastics material) with a binder containing a plastics material, and to processes for production of such products.

The binder can include the plastics material in an emulsion form or alternatively the substrate material can be formed into an emulsion and the plastics material added to that substrate emulsion (preferably by spraying). As stated previously, reference to "composite board" herein is intended to provide a generic reference to a variety of composite board products that use particles of lignocellulosic, rubber or non-recyclable plastics materials in their construction. By forming an emulsion including the plastic material, droplets or particles of the plastics material are distributed throughout the emulsion and ultimately through the composite product formed.

The invention also provides a method of providing the plastics material for use in the emulsion or directly as a spray. When used as a plastic spray, the plastic can be added to an emulsion formed from the substrate material or it can be applied to a timber or composite board such that a coating is formed on the board, or such that the product produced can be a plywood type product. Spraying a plastics material or an emulsion containing a plastics material onto a board allows even and thin distribution of the material onto the board and also maximises the "soaking it" effect thus improving the bonding achieved.

While the use of plastics material in the manufacture of composite board products is known, the plastics material has been used as a plasticised binder directly onto the substrate material. The plastics material is thus pre-treated, is not raw waste material and is generally simply poured in and mixed. The process according to the present invention allows use of raw waste plastics material in the binder.

The use of the plastics material in an emulsion binder form, or adding the plastics material to a substrate material in an emulsion form, resulting in particles of the plastic material being distributed, allows many of the advantages stated herein.

The specification discloses two basic methods of use in the present invention.

One method involves the manufacture of the plastics material under a vacuum prior to emulsification. In the preferred form stated herein, the plastics material is formed from basic component materials during the process itself, rather than simply melting the plastics material. Alternatively plastic materials can be melted to a liquid consistency under the vacuum seal. For ease of reference this will be referred to as a "closed" process. The plastics material formed in the closed process can be used to form the plastics based emulsion binder or be added to a substrate based emulsion or applied directly to a timber or composite board as a coating or plywood binder, preferably as a spray.

Another process uses chemical reactions to emulsify the plastics material to form a binder composition for substrate material in an "open" process lie not under vacuum seal).

With reference to the "closed" process, the present invention in a preferred embodiment also provides a composite material and method of making same.

The various substrates which may be treated by the plastics material formed in the process include lengths of timber and waste products derived from lignocellulosic material, as well as waste rubber and non-recyclable plastics material, to be reconstituted and extruded in a suitable form. Furthermore, composite product can be formed into sheets which can then be sandwiched together before the plastics material has solidified so as to form an improved "plywood" type product. Alternatively the plastics material can be sprayed onto the timber or composite board as a coating or to form plywood.

In a preferred embodiment of the process as shown in FIG. 1 there are provided two raw material hoppers 1a and 1b which contain the substrate material to be reconstituted. These hoppers are balanced on load cells 2a and 2b and have automatic feed valves 3a and 3b thereby enabling the introduction of the raw substrate materials into the mixing unit 4 to be automated.

In the preferred embodiment the mixing unit 4 is made of stainless steel and is designed to accept a wide variety of materials such as wood chippings, non-recyclable plastic, cardboard, rubber etc. An auger 5 travels the complete length of the mixing unit 4. "Worm flat plates" 50, as shown in FIG. 3, are welded on the auger in a substantially horizontal position relative to the blade so as to allow the mixing of the various raw materials. Furthermore, in the preferred embodiment a vacuum line 6 is provided so that the materials can be mixed under vacuum.

As shown in FIG. 1, at the extruder end of the mixing unit there are provided a number of heavy duty nozzles 7 to introduce the polymer under pressure onto the raw materials travelling through the mixing unit 4.

Upon leaving the mixing unit, the product then enters a compression extruder 8 which, in the preferred embodiment, is made of stainless steel. An auger 9 travels most of the length of the extruder to move the product through the extruder. The distance between the blades at the entry end of the compression extruder 8 are spaced so as to facilitate the entry of large quantities of the product to be formed, while the blades at the exit end of the extruder 8 are spaced progressively closer together to provide compression, as known in the art.

As the mixed product travels through the extruder 8, the spacing of the blades reduces so as to compress the product, such compression initially commencing in the first section 10. As the product passes through the second section 11, third section 12 and fourth section 13 the diameter of the extruder 8 also decreases so as to further compress the product to be formed, with the diameter of the exit to the fourth section being calculated to correspond with the required final sizing of the end product. In the preferred embodiment, the temperature of the first four sections of the compression extruder 8 are controlled by use of a heating jacket (not shown) which is mounted on the exterior of the extruder. However, it should be appreciated that the present invention could utilise any other suitable means of controlling temperature. The temperature of these parts of extruder 8 should be such to maintain the polymer material in a melted form thus allowing compression and forming of the product.

In the fifth section 14 of the extruder 8 the product is compressed into its final form and is cooled to a temperature below the melting point of the polymer until the product is of sufficient strength to be trimmed and handled.

In the preferred embodiment of the invention as shown in FIG. 1, the spray system is designed to be able to take non-polymer materials and convert them into the desired polymers. In the preferred embodiment raw materials are contained in two tanks 15a and 15b with one tank holding caprolactam+NL New™ (methol ethyl ketone peroxide) (hereinafter referred to as "chemical 1") and the other tank containing caprolactam +activator KU2-8107™ (a combination Of triallylcyanurat and water soluble wax)(hereinafter referred to as "chemical 2"). Thus nylon is formed immediately preceding application to the substrate material in the mixing unit 4. The chemical ingredients are available from Bayer™ A.G.

A preferred nylon forming combination is "chemical 1"—1 kg caprolactam, 100 ml of activator KU2-8107™ (a combination of triallylcyanurat and water soluble wax); 200 g polyethylene—and heated to about 150° C.: "chemical 2"—60 ml standard battery acid+100 ml liquid paraffin. Chemical 2 is blended with chemical 1 and mixed until the desired consistency is achieved. To form an emulsion, the mixture is then pumped into the water at between 95° C.-97° C. held in an emulsifier. Emulsification for a suitable time (between 2-4 hrs) to remove lumps is then completed, as is discussed in more depth below. The acid used can be battery acid or similar concentrations of sulphuric acid or hydrochloric acid.

Other polymers can be used in the applicator i.e. polyethylene, polypropylene, nylon and polyester all can be used in granule form and cross linked with urethane resins and also with cycloaliphatic diamines at temperatures about 150° C. to formulate thick-layer, elastic primers, stone-chip primers and underbody protection.

From container tanks 15a and 15b the chemicals 1 and 2 are introduced separately through pipes 16a and 16b into an "applicator" 17. In the preferred embodiment, the applicator is constructed of stainless steel and pipes 16a and 16b which pass through the applicator 17 in a double helical configuration as shown in FIG. 1. On the underside of each pipe heat sensors (not shown) are fitted. The portions of pipes 16a and 16b passing through the applicator 17, can be coated with a fire clay containing chromium dioxide and carbon black if desired.

A number of microwave units 18 are situated on the outside wall of the applicator 17 as shown in FIG. 1. Each microwave unit in the preferred embodiment has a power of 850 watts and is run in pulses of 15 minutes to heat chemicals 1 and 2 as they pass through the applicator. Alternative heating arrangements as will be known in the art may also be used.

The applicator 17 is further shown in FIG. 2. The embodiment as shown in FIG. 2 only shows a single container tank 15*a* and pipe or conduit 16*a* passing through the applicator. Of course, this apparatus could be duplicated as shown in FIG. 1.

The conduits 16*a*+16*b* may include a fire clay containing, or coated with, a suitable absorber of microwave energy such as chromium dioxide or may comprise a glass tubing, again preferably with a microwave absorbing coating and also perhaps a heat resistant cladding. This allows the microwaves to heat the conduit and/or the plastics material in the conduit.

The conduit 16*a* may take an indirect path between the inlet to the applicator 17 from the container 15*a* and the outlet 24 as shown in FIG. 2, to provide a greater path of conduit within the applicator and, therefore, a longer time exposed to the microwaves generated by microwave generators 18. This is also seen in the double helical configuration shown in FIG. 1.

A rotary valve 25 may be incorporated between the container of the raw material 15*a* and the inlet of the conduit 16*a* into the applicator 17. Also, a pump 26 may be provided within the apparatus to ensure the flow of melted polymer material through the applicator 17 exits the applicator 17 under pressure.

As shown in FIG. 2, the housing 27 of the applicator 17 should be suitably insulated and preferably retains heat within the system and may incorporate heat expansion facilities to ensure the integrity of the housing is not disrupted by the variation of temperatures within the applicator 17 during the activated or deactivated states of the microwave generators 18.

As shown in FIG. 1, the static mixing unit 19 and thus the mixing of the materials in conduits 16*a* and 16*b*, occurs outside of the microwave applicator 17. In an alternative configuration, these may be incorporated within the applicator 17 to ensure the mixing of the component materials contained in tanks 15*a* and 15*b* occurs at the correct temperature.

The control of the microwave generators 18 may allow a variety of control temperatures to be achieved within the applicator 17 to heat individual materials or to handle a variety of different component materials.

Upon leaving the applicator 17, the pipes 16*a* and 16*b* combine to enter a static mixing unit 19 where the two heated chemicals 1 and 2 are mixed and brought to a temperature of approximately 130° C. At this temperature, chemicals 1 and 2 begin to react and chains of polymers begin to form. In the case of the particular component materials of chemicals 1 and 2, Nylon-6 begins to form. Upon leaving the static mixer 19 through pipe 20 via pump 21 the heated mixture is introduced into spray heads 7. In the mixing chamber of each spray head 7 the mixture is brought up to a temperature of approximately 160° C. thereby causing polymerisation (to Nylon-6).

The plastics material formed in the spray head could be sprayed directly onto timber or composite board followed by compression to form ply or simply coating the board. A preferred option is nylon-6 or a combination of polyethylene and caprolactam which is melted together at temperature between about 160° C.-200° C. With molten plastic spray, the contact with air prior to compression would be kept to a minimum as is well known. Spray between compression rollers for example could be used. If sprayed onto particulate substrate material leg in mixing unit 4) the composition formed would be extruded as a preference although standard compression techniques could also be used. Alternatively, the plastic material formed could be transferred from the spray head into an emulsifier containing hot (eg between 80° C. and 97° C.—preferably 85° C.-92° C.) water, or an emulsion mixture substantially as described later herein, but replacing the pre-dissolved acrylic with the plastic formed in the sprayhead. The emulsion could then be added to mixing unit 4 or used in the "open" process referred to later herein.

The emulsion would be formed in the hot water (eg about 30—60 litres as desired) and the emulsifier run for sufficient time to remove all lumps.

When sprayed onto the particulate product substrate in mixing unit 4 the temperature of the polymer (eg nylon) is suspended and the rate of subsequent polymerisation can be controlled by using the heating jacket to manipulate the temperature in the various sections of the compression extruder 8 with the final sections being used to chill the product thereby causing rigidity.

It should be appreciated that for different applications a cross-linked activator can be introduced into the mixing chamber fitted to the nozzles. Similarly, substances such as dyes, perfume and/or fire retardants can be introduced into the polymer mixture as desired should these characteristics be required of the end product. One such fire retardant used in the preferred form of the invention is Porofor™ Adc/m (an azodicarbonic acid diamide preparation) although many alternatives can be used as known in the art.

The process can also be used to combine two sources of waste material where waste recyclable plastics materials are used as the plastic binder material base and waste lignocellulosic materials or non-recyclable plastics materials or rubber materials (for example) are used as the substrate (eg in mixing unit 4). Other type of lignocellulosic waste such as garden detritus (e.g. bark, branches, leaves etc.) wood chips, sawdust and the like can all be used. The waste recyclable plastics material used as the binder base can include strapping and other waste materials and combinations of plastics. Plastics which cannot be recycled can be encapsulated in this process and thus used as the substrate.

Prior to use in the process, the waste substrate material preferably is ground or otherwise formed into lengths of between 1.5 mm and 3.0 mm with lengths of about 2.0 mm preferred. This step may not be needed if the material is sawdust or the like. The waste plastics material to be used as the binder will be chopped into a powder usually of a finer dimension than the waste lignocellulosic, or other substrate, material (i.e. having a dimension of less than about 1.5 mm for example) although this is optional.

The pump indicated at 26 in FIG. 2 may need to be adapted to pass different thicknesses of polymer (ie plastics material) which will depend upon the materials used. The pump will also be heated to the system requirements to maintain the polymer, or pre-polymer components, in liquid or fluid form. Such an adapted pump will usually be needed when using waste recyclable plastics material as the source of the polymer. The types of plastics material or mixture of various type of plastics materials may impact on the viscosity and other characteristics of the melted plastic when using pre-polymer components in the activator 17 (e.g. chemicals 1 and 2 referred to previously) this is less likely to be a problem. Similar issues may also arise with the spray heads used to apply the polymer to the substrate. This may be solved by known means. Preferably the pump will be a self cleaning pump and suitable forming nozzles and tubes can be fitted.

An alternative to the device disclosed with reference to FIGS. 1 to 3 will incorporate a large paddle wiping mixer (see FIG. 4) This mixer will run at a temperature of between 450° C. and 600° C. preferably at about 500° C. The use of a large paddle wiping mixer 40 allows the waste recyclable plastics material to be re-melted and mixed thoroughly through the ground lignocellulosic material (such as sawdust etc.) which is to be bonded. It is preferred to preheat all the substances which are needed for the bonding process as this will cut down manufacturing time.

The method and apparatus of the present invention may need to be modified for reconstituting rubber and/or otherwise non-recyclable plastics material. This embodiment differs from the method and apparatus described by FIG. 1 in that the substrate is supplied to the mixing unit 4 as an emulsion, rather than directly from the hoppers 1a, 1b. The plastics material from the spray heads will be applied to a substrate in emulsion form in mixing unit 4. As will be appreciated a lignocellulosic material could be used as the substrate as well, if desired.

An example of the formation of the required emulsion is as follows:

Pre-dissolved acrylic, water soluble wax and fatty acid, in the proportions 30%, 50% and 20%, respectively, parts by weight to 100 kg of substrate, are mixed in a first blender under vacuum, together with the substrate, lignocellulosic particles or ground rubber, and/or otherwise non-recyclable plastics material (e.g. polyethylene, polypropylene, PET or polystyrene). This mixture is brought up to a temperature of 300° C. which melts the chemicals and plastic waste material to a liquid.

In a second blender morpholine, K.O.H 100 and aromatic polyisocyanurate in D.O.P., in the proportions 20%, 20%, 60%, respectively, parts by weight to 100 kg substrate, are mixed under vacuum and again brought up to a temperature of 300° C.

The contents of the first blender are then pumped into the second blender, and maintained at the temperature of 300° C.

A third container, comprising the emulsifier, is filled with a required amount of water, brought up to a temperature of 95° C. This is evacuated to remove all oxygen. An interconnecting tube from the second blender to the emulsifier is heated to 360° C. This allows the liquid from the blenders to flow freely. The mixture from the second blender flows into the emulsifier in which a vortex has been formed in the heated water by high speed impellers. When the heated emulsified substrate is released into the water it is immediately mixed and sucked through a sizing mulcher inside the emulsifier on the opposite side to the heated tube interconnecting the second blender to the emulsifier.

The resulting treated substrate enters the main mixing unit 4 (as in FIG. 1) and proceeds through the process is previously described with the plastics material preferably sprayed into the substrate emulsion.

In order to produce final reconstituted products of different strengths other additives may be added. For example, soft rubber bonding agents or cross-linkers for harder rubbers, such as acetic acid, acetone, aninile, butyl acetate, hydrogen peroxide or toluene.

The composite product could be used as a building material, for example, which is relatively strong and resistant to water absorption, which allows production of high grade boards from boards with knots and holes, in which surface splitting of the building material is reduced, in which the said building material is easily separated from concrete and is relatively resistant to Taber abrasion and where the production of toxic by-products is minimised. Further properties such as fire retardant properties may be provided by inclusion of suitable additives as will be known in the art, or by choice of polymer.

Using this process rubber tyres, belting and synthetic rubber can be manufactured into new products such as power poles, mooring poles, railway sleepers, carpet underlay, conveyor belts, shock absorbers, engineering pads, and the like.

To produce a soft reconstituted product, for example for manufacturing carpet underlay, the crumbed, granulated or ground rubber needs to be very flexible. Therefore, for every 1 kg of rubber substrate 2% (20 g) of polymer bonding is required. To make a very hard product, for every 1 kg, 6% (60 g) of bonder may be added.

To produce a paper product for example, a hot plastic emulsion spray (from spray heads as described previously) could be applied across layered sheets of paper, between compression rollers, to form a composite paper board. Cardboard and like substrates can also be used in such processes.

It is thus seen that by this embodiment of the present invention there is provided an improved method of manufacture for producing a composite product having desired properties including properties appropriate for a building material.

With reference to the "open" process, this method allows the formation of composite products without the use of a vacuum seal. While it allows composite products with high levels of plastics material to be produced, one particular advantage is that it also allows the production of a lignocellulosic composite product that includes low levels of plastics material.

While producing lignocellulosic composite products with higher amounts of plastics material is possible with this process, there are substantial advantages in reducing the plastics material content. These include cost and the less "plastic" look of the final product, while retaining the strength and integrity of the product itself.

As stated previously, it is known that the amount of plastics material can be lowered by controlling the size of the lignocellulosic material used, but this adds to the processing requirements of the production process. Generally, at least 20% of plastics material is needed to extrude an acceptable composite product (and thus when coupled with particle size restrictions). From a timber company's perspective, the requirement to use increased levels of a plastics material in the production of a composite board product increases the cost of production as well as detracting from the timber-look of the product.

The open process can use a broad range of lignocellulosic materials and a broad range of sizes of lignocellulosic material together with a reduced amount of plastics material to produce a composite product that can be used as a variety of finished products.

The lignocellulosic material used in the process may be any form of material as will be known to a skilled person in this art (eg wood chips, bark chips, sawdust, rice husks etc) and will preferably have a diameter of between about 2 mm and about 60 mm. Various types of material (pine, natural timbers) can be used as desired. This is not critical.

The binder includes formalin, methylchloroisothiazolinone, and/or methylisothiazolinone FD&C, a plastics material, paraffin oil, and water.

The plastics material can be of any suitable type and size. For example, nylon, polyethylene, polypropylene, PVC, styrofoam, or acrylic can be used. These can be provided as granules, powders, or pieces as desired.

Preferably, polyethylene will be used with formalin while one of, or a combination of, methylchloroisothiazolinone and methylisothiazolinone FD&C will be used with polypropylene, nylon, PVC, styrofoam and/or acrylic.

Additives to the binder for increased product strength can include the use of French chalk or talcum powder and can also include:

1,3-bis-(methylol)-imidazolidone-2

1,3-bis(methylol)-4,5-dihydroxy ethoxyimidazolidone-2

1,3-bis(methylol)-4,5-dihydroxyimidazolidone-2

1,3-bis(methoxymethyl)-4,5-dibenzyl-4,5-bis(perfluoroalkoxy) imidazolidone-2

1,3-bis(methylol)-4,5-dialkyl-4,5-dialkoxy-2-thio-imidazolidine 1,3-bis(methylol)-4,6-dialkoxy-2-thio-1,3-diazolidine 1,3-bis(alkoxymethyl)-4,6-dialkoxy-2-imino-1,3-diazolidine Undiluted Peroxide 2-alkyl-4,6-bis(methylol)-1,3-dioxolano(4,5-d)imidazolidone-5

4,6-bis-(alkoxymethyl)-2,5-dioxo-1,3-dioxolano(4,5-d)imidazolidone $\alpha,107$-bis(4,5-dimethylol-1,3-dioxolano(4,5-d)imidzolidin-2-yl)alkane 2,2-dialkoxy-4,6-bis(alkoxymethyl)-1,3,2-dioxasilolano(4,5-d) imidazolidone-5

2,2-spirobi(4,5-dimethylol-1,3,2-dioxasilolano(4,5-d)imidazolidone-5

2-butyl-4,6-dimethylol-1,3-dioxolano(4,5-d) imidazolidone-5

1,3-bis(ethoxymethyl)-4,5-bis(formamido)-4,5-dimethyl-imidazolidone-2

1,3-bis(propoxymethyl)-4,5-bis(ethoxymethoxy)imidazolidone-2

1,3-bis(butoxymethyl)-4,5-bis(heptadecanoxy) imidazolidone-2

1,3-dipropylol-4,5-dimethoxy-imidazolidone-2; and 1,3-bis(ethoxypropyl)-4,5-diethoxyimidazolidone-2

Other additives can also be included such as dyes, fire retardants, insect repellents and anti-mould products for example.

The binder is produced via a hot melt process, in which the plastics material (eg polyethylene) is melted into the formalin/paraffin oil mixture, followed by mixing with boiling water in an emulsifier. The mixing is continued for a sufficient time to allow the mixture to cool to room temperature (eg between 3-6 hours) and results in a fine creamy liquid being produced.

The emulsifier used can be of any known type such as a Wilson 951 High Pressure Emulsifier.

The emulsified binder is then mixed with the substrate material to the consistency desired.

The composite board can then be produced using known compression or moulding techniques and results in a product which can be either of the panel-type or of the structural beam-type as desired. Composite products having structural strength qualities for use in construction can be produced by increasing the amount of plastics material in the binder (and hence in the final product) and by the use of strengthening additives. While an extrusion process could be used to produce the final product, such process is not preferred due to the low levels of plastics material used which results in a rough finish to final product.

EXAMPLES

Example 1

Binder Production—Polyethylene/Formalin (A) 40 ml of high grade formalin (formaldehyde) was mixed with 20 ml of liquid paraffin oil. The formalin is preferably high-grade formalin although a low-grade product could be used if desired.

(B) Following the mixing of the formalin with the liquid paraffin oil, 1 kg of polyethylene (in the form of granules and powder) was added to the mixture. 150 g chalk powder (talcum powder) was also added to the mixture for strengthening reasons.

(C) The mixture created in (B) above was then heated in order to melt the plastics material into the formalin/paraffin oil. The liquid was placed in a vacuum sealed melting drum using microwave units to heat the drum. The exterior surface of the melting drum was coated with a carbon based material. The microwave units heat the carbon-based coating on the drum which transfers that heat to the interior. This results in a relatively quick temperature rise within the melting drum to a maximum of between about 600 and 700° C. The temperature at which a nylon plastics material, for example, will melt exceeds 300° C., while if a polyethylene, polypropylene, or acrylic material is used, for example, as the plastics material, a temperature of between 160° C. and 180° C. may be used. Appropriate temperatures may be selected as will be known to a skilled person. The melting drum included a suitable non-stick material as will be known in the art on the inner walls. The drum was also fitted with a viscosity sensor, to determine when the content is liquid. With polyethylene granules and powder being used the melting drum was heated to approximately 180° C. via microwave heating. As will be readily apparent the melting drum could also be heated directly by thermal heat (electric/gas) although this will be a slower, and thus less preferred, process.

(D) Following creation of the hot plastic containing liquid in the melting drum, the liquid was transferred from the drum to an emulsifier. The emulsifier contained 40 litres of boiling water. This amount of water will allow structural strength product to be produced. [If making non-structural products more water would be used in the emulsifier (eg 60 litres for the 60 ml paraffin/formalin and 1 kg plastic mixture)]. The emulsifier was run for approximately 4 hours in which time the temperature was reduced gradually to room temperature. The emulsifier used was a Wilson 951 High Pressure Emulsifier.

(E) The resulting product was a fine creamy liquid including the plastics material.

Example 2

Five samples (E1-E5) below) were prepared using the binder prepared in Example 1. A mixture of 1 kg sawdust and 2 kg long fibres (pine) was used into which the binder was mixed. The amount of binder per sample is shown in Table 1. The test samples were produced using an electrically heated mould (top and bottom heat of 160° C.) at a pressure of 1 ton for 45 minutes.

TABLE 1

Composite Product Production

| Code | Board Construction* | Binder % By Weight | Thickness Mm | Length mm | Width Mm |
|---|---|---|---|---|---|
| E1 | N/A | 8 | 27 | 300 | 190 |
| E2 | N/A | 6 | 23 | 300 | 190 |
| E3 | N/A | 6 | 23 | 300 | 190 |
| E4 | $\frac{1}{3}^{rd}$ Surface Flake and $\frac{2}{3}^{rd}$ Core Flake | 6 | 22 | 350 | 225 |
| E5 | $\frac{1}{3}^{rd}$ Surface Flake and $\frac{2}{3}^{rd}$ Core Flake | 8 | 22 | 350 | 225 |

*Indicate source of wood flake, coarse or fine, or approximately % by layers, binder type etc.

The board construction tests were carried out on sample E4 and E5 only, due to lack of sufficient sample.
Sample No. 4 Weight 1050 g: 350 g surface flake (175 g top 175 g bottom) 700 g Core Flake (centre)
   Binder: 15.75 g top-15.75 g bottom-63 g centre
   Finished Weight: 1.14 kg (after sanding).
Sample No. 5 Weight 1,200 g: 400 g Surface Flake (200 g top-200 g bottom) 800 g Core Flake (centre)
   Binder: 18 g top-18 g bottom-72 g middle
   Finished weight: 1.3 kg (after sanding)
As can be seen from Table 1, the proportion of plastics material (in the binder) to the lignocellulosic material in the composite board is very low.

Example 3

Comparative Product Testing

The five samples of product referred to in Example 1 and four samples of CSR premium grade particle board flooring were tested in parallel.

The five samples as described in Example 1 were numbered E1, E2, E3, E4 and E5. CSR samples were numbered C1, C2, C3 and C4.

Each sample was cut into 2 pieces approximately 300×100 mm labelled A and B, and tested for thickness and density. The A series samples were tested for bond durability (72 hour boil) and mass and thickness were measured every 24 hours. The B series samples were tested for MOR. Two samples, E4 and E5 from the B series were also tested for moisture content.

E1-5 samples appeared to be dense, with no voids between the wood particles. These samples had the appearance of wood particles embedded in clear plastic.

Results

Thickness and density results are shown in Table 2. The five E samples were variable in both properties, as they had been made under laboratory conditions.

Thickness, swell and water absorption results are shown in Table 3. The E samples were superior to CSR samples in both properties. The E samples showed no fibre swell or surface roughness, whereas CSR samples were severely affected. (Some isolated swelling of spots of binder, but not fibre, occurred on the E samples. This was said to be the result of improper blending during sample preparation.)

MOR results for Series A (wet) are shown in Table 4 and Series B (dry) in Table 5. (It should be noted MOR testing was not carried out according to the Australian Standard method, as there was insufficient sample to allow the required distance between the supports on the test apparatus. However, the formula for MOR calculation took this into account, and all results are consistent with one another.) The E samples showed superior retention of MOR after the 72 hour boil period, although the CSR samples still met the requirements for Glue Board Durability as described in AS/NZS 1859.1 (Int): 1995.

Moisture content of the two samples tested from Series B is also shown on the report from Materials and Testing Laboratories. Low moisture content of the E sample material may indicate that the wood particles are totally sealed by the binder used.

Conclusion

All five E samples were strong, with good water resistance properties. Surface integrity after boiling was excellent.

TABLE 2

Thickness and Density
PRODUCT TESTING

| SAMPLE ID | THICKNESS mm | DENSITY kg/m3 |
|---|---|---|
| E1A | 28.39 | 927 |
| E1B | 28.16 | 903 |
| E2A | 23.90 | 820 |
| E2B | 24.45 | 780 |
| E3A | 23.95 | 819 |
| E3B | 23.10 | 826 |
| E4A | 22.00 | 909 |
| E4B | 21.85 | 834 |
| E5A | 22.30 | 839 |
| E5B | 21.75 | 790 |
| C1A | 19.10 | 679 |
| C1B | 19.15 | 677 |
| C2A | 18.95 | 678 |
| C2B | 19.00 | 673 |
| C3A | 19.95 | 639 |
| C3B | 20.00 | 640 |
| C4A | 19.90 | 642 |
| C4B | 19.65 | 715 |

TABLE 3

Thickness Swell and Water Absorption During 72 Hour Boil
PRODUCT TESTING

| SAMPLE ID | % THICKNESS SWELL | | | % WATER ABSORPTION | | |
|---|---|---|---|---|---|---|
| | 24 hr | 48 hr | 72 hr | 24 hr | 48 hr | 72 hr |
| E1A | 2.0 | 2.7 | 3.2 | 3.0 | 4.0 | 5.0 |
| E2A | 4.0 | 4.8 | 4.8 | 16.5 | 19.5 | 20.7 |
| E3A | 2.3 | 3.0 | 4.2 | 10.3 | 13.3 | 14.6 |
| E4A | 2.3 | 2.7 | 3.4 | 5.9 | 7.7 | 8.5 |
| E5A | 3.4 | 3.6 | 3.8 | 13.8 | 17.0 | 17.8 |
| C1A | 27.0 | 27.5 | 27.5 | 97.2 | 96.5 | 94.5 |
| C2A | 30.6 | 30.3 | 29.0 | 103.2 | 99.3 | 98.1 |
| C3A | 16.0 | 15.7 | 16.3 | 95.8 | 94.1 | 92.5 |
| C4A | 18.1 | 18.8 | 17.8 | 100.1 | 95.0 | 95.0 |

TABLE 4

Wet Samples - Bend Tests of Samples Supplied

| Sample ID | Dimensions mm | Load (N) | Modulus of Rupture MPa |
|---|---|---|---|
| C1A | 19.1 × 100.0 | 730 | 7.2 |
| C2A | 18.95 × 100.5 | 570 | 5.7 |
| C3A | 19.93 × 100.0 | 790 | 7.1 |

TABLE 4-continued

Wet Samples - Bend Tests of Samples Supplied

| Sample ID | Dimensions mm | Load (N) | Modulus of Rupture MPa |
|---|---|---|---|
| C4A | 19.90 × 100.0 | 870 | 7.9 |
| E1A | 28.39 × 87.5 | 4630 | 23.6 |
| E2A | 23.9 × 92.0 | 2290 | 15.7 |
| E3A | 23.95 × 93.5 | 2530 | 17.0 |
| E4A | 22.0 × 100.5 | 2740 | 20.3 |
| E5A | 22.3 × 101.5 | 2410 | 17.2 |

TABLE 5

Dry Samples - Bend Tests of Sample Supplied

| Sample ID | Dimensions mm | Load (N) | Modulus of Rupture MPa |
|---|---|---|---|
| C1B | 19.15 × 101.0 | 2360 | 22.9 |
| C2B | 19.0 × 101.0 | 2190 | 21.6 |
| C3B | 20.0 × 101.0 | 2300 | 20.6 |
| C4B | 19.65 × 101.0 | 2710 | 25.1 |
| E1B | 28.16 × 101.0 | 6900 | 31.1 |
| E2B | 24.45 × 96.5 | 4350 | 27.1 |
| 27.1 | 23.1 × 95.5 | 4100 | 29.0 |
| E4B | 21.85 × 99.0 | 3530 | 26.9 |
| E5B | 21.75 × 101.5 | 3140 | 23.5 |

(Load Speed 8 mm/minute)

E4 B Moisture % 1.1

E5 B Moisture % 1.6

Equipment: Shimadzu Universal testing machine. Model REH 50, Serial No. 72666. Calibration due April 1995

Technique: Three point loading using 240 mm between supports (50 mm diameter rollers) and a 20 mm diameter central loading former.

$$\text{Modulus of Rupture calculated as } \frac{3 \times \text{Maximum Load } (N) \times 240}{2 \times \text{Width of Specimen} \times \text{Thickness of Specimen}^2}$$

As can be seen from the results shown in the Examples, the composite boards produced according to the invention showed clearly favourable material characteristics when compared with a comparable currently available product.

Example 3

Testing of Coconut Wood Chip Board

A burn test and boil test on a sample of coconut wood based chip board supplied was carried out. The board was made using a binder as for Example 1 with coconut husks ground to a powder. Temperatures and processes are as for Example 2.

Burn Test

Samples of various woods were placed in a Bunsen flame, to determine the length of time required for the wood to burn with a self sustaining flame.

| Sample | Time required to Burn |
|---|---|
| 5 ply commercial board | 2 minutes |
| 7 ply commercial board | 2 minutes |
| Commercial Chip Board | 2 minutes |
| Coconut Wood Chip Board | 2 minutes |

The coconut wood board flammability would be improved if the resin were to contain a flame retardant. This of course is an option as desired.

Boil Test

This test is based on the first part of AS2098.2 (1977) in an attempt to compare the long term stability to outdoor weathering. This standard is specific for veneer and plywood, and was used because there are no other similar standards for particle boards. The visual assessment is therefore our own way of describing the result.

Samples were held in a boiling water bath for 72 hours, removed and cooled in water then examined visually.

| | |
|---|---|
| 5 ply commercial board | did not delaminate |
| 7 ply commercial board | did not delaminate |
| Commercial Chip Board | disintegrated into a mound of individual chips |
| Coconut Wood Chip Board | did not disintegrate. Minor cracks appeared throughout the structure. These cracks are most likely to be due to the large particles swelling with water. |

As can be seen, the coconut wood chip board shows distinct advantages characteristic in comparison to commercial chip board, and similar properties to ply.

Example 4

Subject: Bend test comparison on samples supplied

Equipment: Shimadzu Universal Grade 1 testing machine. Model REH 50, serial no. 72666 Calibration due April 1993

Technique: Three point loading using 240 mm between supports (50 mm diameter rollers) and a 50 mm diameter central loading former.

Modulus of Rupture calculated as;

$$\frac{\text{Maximum of load} \times 240}{\text{Width of specimen} \times \text{thickness of specimen}^2}$$

Results:
A1 commercial plywood
A2 standard chip board
A3 sawdust/emulsion board [emulsion–polyethylene+nylon (ratio 1:2) in water, manufactured according to the processes of Examples 1 and 2.

| Sample | | Size mm | Load N. | MOR* |
|---|---|---|---|---|
| A1 | 1 | 14.5 × 45.6 | 670 | 16.8 |
| | 2 | 14.5 × 48.4 | 830 | 19.6 |
| | 3 | 14.5 × 48.4 | 770 | 18.2 |

-continued

| Sample | Size mm | | Load N. | MOR* |
|---|---|---|---|---|
| A2 | 1 | 13.2 × 46.7 | 350 | 10.3 |
|  | 2 | 13.5 × 48.3 | 350 | 10.3 |
|  | 3 | 13.4 × 46.0 | 350 | 10.3 |
| A3 | 1 | 14.2 × 46.6 | 1100 | 28.1 |
|  | 2 | 13.5 × 47.0 | 970 | 27.2 |
|  | 3 | 14.5 × 45.7 | 1170 | 29.2 |

*MOR = Modulus of Rupture

Example 5

Introduction 1 kg Polyethylene+200 g caprolactam mixed and heated to 170° C.–180° C. Sprayed through nozzles (at about 180° C.) onto surface of boards and scarf joints. Boards compressed at about 1 ton pressure.

Test Samples

Sample 1 was a piece of 15 mm thick Shadow Clad plywood containing a scarf joint made with phenol glue.

Sample 2 was a 630 by 450 mm piece of 15 mm thick plywood (5 ply) containing a scarf joint. The scarf joint was made using the polyethylene/caprolactam molten binder spray described above. Five different thicknesses test piece widths were used. The thickness of the binder was approximately 125 microns, and applied along 100 mm sections of the joint.

Bending test specimens, approximately 46 mm deep by 630 mm long, were cut from the samples supplied.

Testing

All testing was carried out in an Instron TT-D test machine. The scarf joint was positioned approximately at mid-span. The load was applied to the top edge of the specimen until failure.

Results

The results are tabulated in Table 6.

TABLE 6

| Specimen | Thickness (mm) | Depth (mm) | Modulus Of Rupture (Mpa) |
|---|---|---|---|
| Shadow clad | 14.16 | 45.93 | 34.41 |
| Shadow clad | 14.04 | 45.63 | 35.28 |
| Shadow clad | 14.13 | 46.14 | 30.11 |
| Shadow clad | 13.58 | 46.14 | 34.88 |
| Shadow clad | 14.12 | 46.15 | 38.65 |
| Shadow clad | 13.98 | 46.27 | 29.52 |
| Shadow clad | 13.72 | 46.61 | 49.45 |
| Shadow clad | 13.88 | 46.33 | 35.62 |
| Shadow clad | 14.36 | 45.96 | 37.65 |
| Shadow clad | 13.60 | 46.48 | 36.05 |
| 1a-20cm | 14.98 | 45.8 | 37.87 |
| 1a-40cma | 14.89 | 45.75 | 29.78 |
| 1a-40cmb | 14.97 | 45.81 | 37.69 |
| 1a-60cma | 14.98 | 45.81 | 37.02 |
| 1a-60cmb | 14.91 | 46.12 | 34.91 |
| 1a-80cma | 14.78 | 45.72 | 28.51 |
| 1a-80cmb | 15.03 | 45.66 | 30.22 |
| 1a-100cma | 14.94 | 45.88 | 33.16 |
| 1a-100cmb | 15.01 | 45.72 | 30.83 |

Because the predominant mode of failure was fracture of the plywood at notched edge of scarf joint, it is difficult to compare the strengths of the different glues (and formulations). A better comparison of joint strength could perhaps be made if tests were undertaken on joint where the scarf was continuous across the entire thickness of the member.

Undertaking tests on small number of samples does not allow the variation in joint properties to be assessed. Tests should be undertaken on joints made with a number of different pieces of plywood and at various times during the pot life of the glue so that the likely variation in joint strength can be measured.

However, it can be seen that the sprayed polyethylene and caprolactam binder formed a scarf joint of at least similar properties to the phenol glue. One advantage of the binder is in the use of a binder glue not using phenol.

The foregoing describes the invention including preferred forms thereof. Alterations and modifications as would be known to the skilled person are intended to be included within the scope of the invention described.

While in the foregoing description there has been made reference to specific components or integers of the invention having known equivalents then such equivalents are herein incorporated as if individually set forth.

Although this invention has been described by way of example only and with reference to possible embodiments thereof it is to be understood that modifications or improvements may be made without departing from the scope or spirit of the invention as defined in the appended claims.

The invention claimed is:

1. A method for producing a composite product including a substrate material selected from lignocellulosic material, rubber and/or nonrecyclable plastics material and;
   a binder, wherein the binder includes a recyclable plastics material in an emulsion form;
   comprising the step of introducing the binder to the substrate material, wherein the composite product produced contains no more than 10% by weight of the recyclable plastics material.

2. The method according to claim 1 wherein the substrate material is particles of lignocellulosic material.

3. The method according to claim 1 wherein the substrate material is a lignocellulosic material selected from any one or more of sawdust, wood chips, bark, rice husks, leaves, branches, paper, and cardboard.

4. The method according to claim 1 wherein the method includes the step of forming the recyclable plastics material for inclusion in the binder emulsion from basic component parts under vacuum seal.

5. The method according claim 1 wherein the method includes the step of forming the recyclable plastics material by melting a recyclable plastic material under vacuum seal.

6. The method of claim 1 wherein the recyclable plastics material in the emulsion is a nylon.

7. The method according to claim 4 wherein the recyclable plastics material formed is nylon-6 and the basic component parts used in its formation selected from caprolactam, methol ethyl ketone peroxide, a combination of triallylcyanurat and water soluble wax; polyethylene and an acid.

8. The method according to claim 5 wherein the recyclable plastics material is heated by passage through a conduit and directing microwaves toward the conduit to heat the material or the conduit and thereby the material.

9. The method according to claim 1 wherein the recyclable plastics material is a recyclable waste plastics material or component parts for formation of a plastics material and the process includes the steps of feeding recyclable waste plastics material or plastics material component parts into a conduit via an inlet which is connected to the conduit, providing at least one microwave transmitter which is adapted to direct microwaves toward the conduit to heat the recyclable waste plastics material or plastics material component parts within the conduit, or to heat the conduit and thereby heat the recyclable waste plastics material or plastics material component parts or both, and providing an outlet to the conduit to allow passage of the heated, formed, product from the conduit.

10. The method according to claim 1 wherein the recyclable plastics material is formed into an emulsion by combination with hot water in an emulsifier, and the emulsion thus formed is used as a binder to form a composite board product from particles of a substrate material.

11. The method according to claim 1 wherein the composite product is formed by extrusion or compression.

12. The method according to claim 1 wherein the substrate is ground to provide fibre lengths of between about 1.5 mm and about 3.0 mm.

13. A method of reconstituting a substrate selected from any one or more of a lignocellulosic material, rubber and/or otherwise non-recyclable plastics material including the steps of forming the lignocellulosic material, rubber and/or plastics material into granulate or particulate substrate, forming a binder emulsion including a recyclable plastics material and then (a) mixing the binder material with the substrate; or (b) compressing the substrate into a board form and spraying the binder onto the board surface, wherein the composite product produced contains no more than 10% by weight of the recyclable plastics material.

14. The method according to claim 13 wherein the binder is sprayed onto the substrate and is nylon or a combination of polyethylene and caprolactam.

15. The method according to claim 13 wherein the binder is sprayed on to the substrate and includes a combination of polyethylene and caprolactam and the combination is heated to between 170° C. and 190° C.

16. The method according to claim 6, wherein the nylon is nylon-6.

17. The method according to claim 7, wherein the acid is selected from battery acid, sulphuric acid and hydrochloric acid.

* * * * *